United States Patent
Gardner

(10) Patent No.: US 8,312,543 B1
(45) Date of Patent: Nov. 13, 2012

(54) USING URL REPUTATION DATA TO SELECTIVELY BLOCK COOKIES

(75) Inventor: Patrick Gardner, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 625 days.

(21) Appl. No.: 12/495,111

(22) Filed: Jun. 30, 2009

(51) Int. Cl.
H04L 29/06 (2006.01)

(52) U.S. Cl. .......................... 726/23; 726/22

(58) Field of Classification Search ............ 726/23
See application file for complete search history.

(56) References Cited

U.S. PATENT DOCUMENTS

| | | | |
|---|---|---|---|
| 7,284,124 B1 * | 10/2007 | Ginsberg | 713/167 |
| 7,490,356 B2 | 2/2009 | Lieblich et al. | |
| 7,617,519 B2 | 11/2009 | Williams | |
| 7,647,634 B2 | 1/2010 | Mayfield et al. | |
| 7,707,632 B2 | 4/2010 | Nath et al. | |
| 7,761,912 B2 | 7/2010 | Yee et al. | |
| 7,788,700 B1 | 8/2010 | Feezel et al. | |
| 7,831,522 B1 | 11/2010 | Satish et al. | |
| 7,870,609 B2 | 1/2011 | Hulten et al. | |
| 7,917,481 B1 | 3/2011 | Kale et al. | |
| 8,087,082 B2 | 12/2011 | Bloch et al. | |
| 2002/0046041 A1 | 4/2002 | Lang | |
| 2004/0019807 A1 | 1/2004 | Freund | |
| 2006/0253458 A1 * | 11/2006 | Dixon et al. | 707/10 |
| 2006/0253583 A1 | 11/2006 | Dixon et al. | |
| 2007/0033636 A1 | 2/2007 | Buckley et al. | |
| 2007/0064617 A1 | 3/2007 | Reves | |
| 2007/0067844 A1 | 3/2007 | Williamson et al. | |
| 2007/0094260 A1 * | 4/2007 | Murphy et al. | 707/9 |
| 2007/0168311 A1 | 7/2007 | Genty et al. | |
| 2007/0208613 A1 * | 9/2007 | Backer | 705/10 |
| 2007/0261116 A1 | 11/2007 | Prafullchandra et al. | |
| 2008/0022384 A1 | 1/2008 | Yee et al. | |
| 2008/0052758 A1 | 2/2008 | Byrnes | |
| 2008/0092235 A1 | 4/2008 | Comlekoglu | |
| 2008/0115213 A1 | 5/2008 | Bhatt et al. | |
| 2008/0120699 A1 | 5/2008 | Spear | |
| 2008/0133531 A1 | 6/2008 | Baskerville et al. | |
| 2008/0141366 A1 | 6/2008 | Cross et al. | |
| 2008/0189788 A1 | 8/2008 | Bahl | |
| 2008/0255928 A1 | 10/2008 | Tomeny | |
| 2008/0288330 A1 | 11/2008 | Hildebrand et al. | |
| 2009/0044024 A1 | 2/2009 | Oberheide et al. | |

(Continued)

OTHER PUBLICATIONS

European Extended Search Report, European Application No. 09169538.7, Oct. 25, 2010, 5 pages.

(Continued)

*Primary Examiner* — William Goodchild
(74) *Attorney, Agent, or Firm* — Fenwick & West LLP

(57) ABSTRACT

A computer system detects and selectively blocks a cookie associated with a website. The system monitors a network traffic stream directed to a client from a website and detects presence of a cookie associated with the website in the network traffic stream. The system detects the cookie in the network traffic stream by analyzing the network stream using a network traffic filtering scheme, such as a deep packet inspection engine. The system further determines a reputation of the website in response to detecting the cookie in the network traffic stream. A reputation of a website represents an assessment of whether the website is trustworthy. Based on the determined reputation of the website, the system selectively blocks the cookie from being stored in the client if the reputation of the website is bad.

19 Claims, 4 Drawing Sheets

U.S. PATENT DOCUMENTS

| | | |
|---|---|---|
| 2009/0165131 A1 | 6/2009 | Treadwell |
| 2009/0172815 A1 | 7/2009 | Gu et al. |
| 2009/0240769 A1 | 9/2009 | Schran |
| 2009/0282476 A1 | 11/2009 | Nachenberg et al. |
| 2009/0287819 A1 | 11/2009 | Iverson |
| 2009/0328209 A1 | 12/2009 | Nachenberg |
| 2009/0328224 A1 | 12/2009 | Hernacki et al. |
| 2010/0031361 A1 | 2/2010 | Shukla |
| 2010/0125911 A1 | 5/2010 | Bhaskaran |

OTHER PUBLICATIONS

Egan, G., "Not All Reputation Technologies are Created Equal," Symantec Corporation, Sep. 22, 2009, [Online] [Retrieved on Mar. 30, 2010] Retrieved from the Internet<URL:http://www.symantec.com/connect/blogs/not-all-reputation-technologies-are-created-equal>.

"GreenBorder", Wikipedia, 1 page, [online] [Retrieved on Dec. 31, 2008] Retrieved from the Internet <URL:http://en.wikipedia.org/w/index.php?title=GreenBorder&printable=yes>.

Ioffe, J., "To Catch a Cyberthief: How Symantec Does It," Fortune Brainstorm Tech, Sep. 14, 2009, 3 pages [Online] [Retrieved on Mar. 30, 2010] Retrieved from the Internet<URL:http://brainstormtech.blogs.fortune.cnn.com/2009/09/14/to-catch-a-cyberthief-how-symantec-does-it/ >.

Rubenking, N., "Nonsignature Antimalware", PCMag.com, Oct. 30, 2006, 6 pages, [online] [Retrieved on Dec. 31, 2008] Retrieved from the Internet <URL:http://www.pcmag.com/print_article2/0,1217,a%253D181852,00.asp>.

"TrustedSource™: the Next-Generation Reputation System White Paper," Secure Computing Corporation, Oct. 2006, 6 pages.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

European Examination Report, European Application No. 09169538.7, Jan. 16, 2012, 4 pages.

\* cited by examiner

USING URL REPUTATION DATA TO SELECTIVELY BLOCK COOKIES

BACKGROUND

1. Field of the Invention

This invention pertains in general to computer security and in particular to detecting and selectively blocking cookies in network communications.

2. Description of the Related Art

A cookie (also known as browser cookie, tracking cookie, web cookie and Internet cookie) is a string of text given to a web browser by a web server. The web browser stores the cookie on a web browser user's computer. The cookie is sent back to the web server each time the web browser requests a web page from the web server. Cookies allow a website to store information on a user's computer and later retrieve it. Cookies allow the website to uniquely identify the user and therefore support functions such as authentication and retention of user preferences.

Cookies can be used to track a user's page browsing at a website. In addition, cookies provided by certain types of third parties, such as online advertisers, can be used to track a user's browsing habits across a variety of websites. Such tracking can allow the third party to build a profile of the user and, in some instances, provide targeted advertising based on the profile. The use of such profiles and targeted advertising introduces privacy concerns as some users prefer that their web browsing activities not be tracked.

One way to overcome the privacy concerns introduced by such tracking cookies is to configure the user's web browser to block all cookies. However, blocking all cookies can interfere with legitimate web site operations and negatively impact the user's browsing experience. Another way to address the privacy concerns is to scan the user's computer for tracking cookies, flag the cookies as security risks, and allow the user to remove the cookies. This scanning technique is resource intensive and can confuse the user as to the nature of the risk presented by the cookies.

Another problem associated with scanning for cookies is that it does not scale well. For example, a domain-based whitelist or blacklist allows a security system to allow or block cookies from listed websites. However, these lists must be provided to the user's computer and require constant updates to stay current. Thus there is a need for techniques for handling tracking cookies that do not suffer from these drawbacks.

SUMMARY

The problems described above are addressed by a method, system, and computer-readable storage medium. Embodiments of the method and system selectively block a cookie associated with a website. Embodiments of the method comprise monitoring a network traffic stream directed to a client from a website and detecting presence of a cookie associated with the website in the network traffic stream. Responsive to detecting the cookie in the network traffic stream, the method determines a reputation of the website and selectively blocking the cookie based on the determined reputation of the website.

Embodiments of the system comprise a computer processor for executing computer program modules and a computer-readable storage medium storing executable computer program modules. The computer program modules comprise a traffic monitoring module configured to monitor a network traffic stream directed to a client from a website, and cookie inspection module configured to detect presence of a cookie associated with the website in the network traffic stream. The modules further comprise a reputation determination module configured to determine a reputation of the website in response to detecting the cookie in the network traffic stream, a cookie response module configured to selectively block the cookie based on the determined reputation of the website.

Embodiments of the computer-readable storage medium report a reputation of a website. The embodiments comprise a traffic monitoring module configured to monitor a network traffic stream directed to a client from a website, and cookie inspection module configured to detect presence of a cookie associated with the website in the network traffic stream. The embodiments further comprise a reputation determination module configured to determine a reputation of the website in response to detecting the cookie in the network traffic stream, a cookie response module configured to selectively block the cookie based on the determined reputation of the website.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
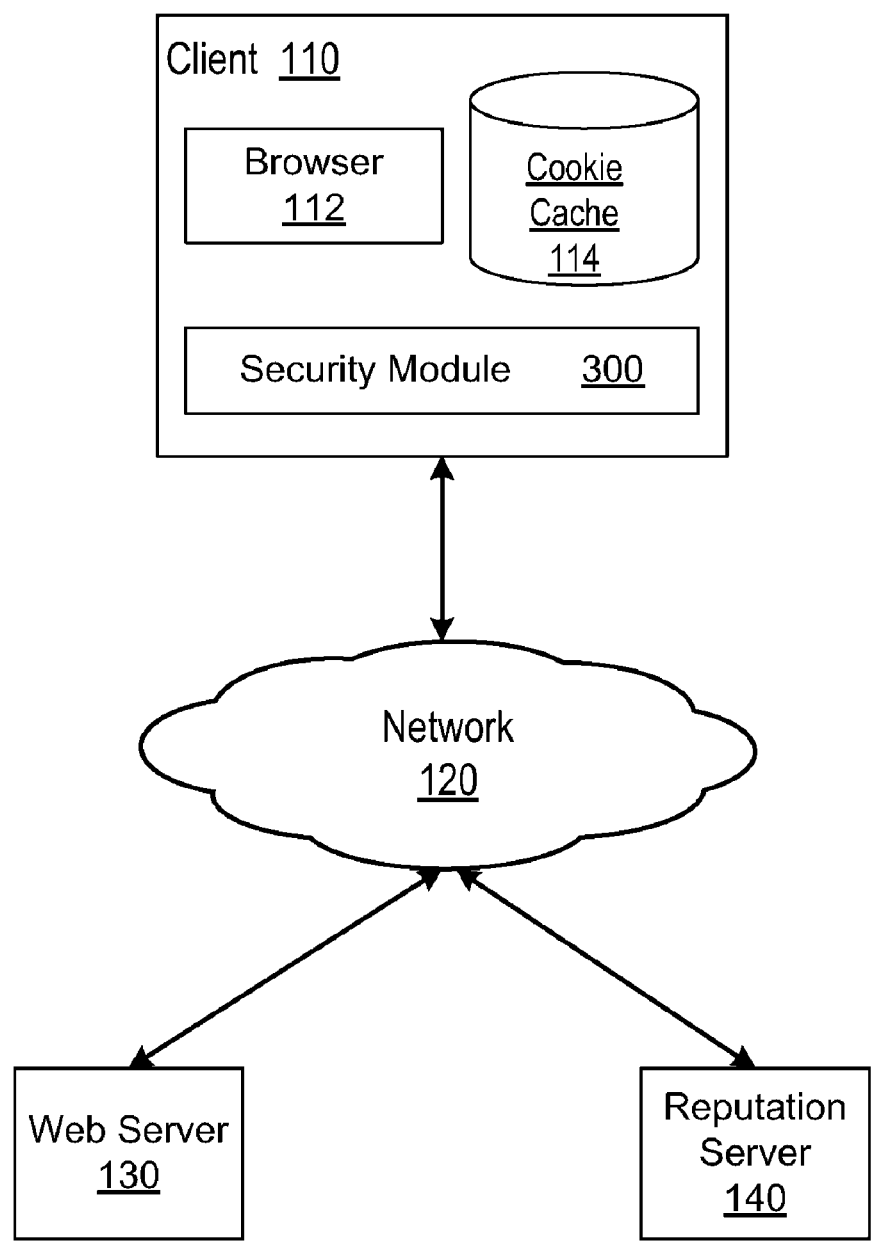
FIG. 1 is a high-level diagram illustrating an environment having a security module that selectively blocks cookies based on reputation according to one embodiment.

FIG. 1 is a high-level diagram illustrating an environment 100 having a security module 300 that selectively blocks cookies based on reputation according to one embodiment. The illustrated environment 100 comprises a client 110, a web server 130, and a reputation server 140 interconnected via a computer network 120. Only one of each entity is shown in FIG. 1 in order to simplify and clarify the figure. Embodiments of the environment 100 can include many clients 110 and web servers 130, and also multiple reputation servers 140.

The illustrated environment 100 represents a typical computing environment where multiple users interact with the web server 130. In this environment, a user uses a client 110 to interact with a website provided by the web server 130. The web server 130 provides the client 110 with web pages of the website. In addition, the web server 130 can provide the client 110 with one or more cookies for the website. Other web servers 130, such as servers operated by third party advertisers providing objects on the web pages, can also provide the client 110 with cookies. In one embodiment, the client 110 monitors the network traffic stream directed to the client from the web server 130 to detect cookies contained therein. The client 110 obtains the reputation of a website providing a cookie to the client, and determines whether to block the cookie based on the reputation.

Turning now to the individual entities illustrated in FIG. 1, the client 110 is used by a user to interact with websites that may create one or more cookies on the client. In one embodiment, the client 110 is a personal computer (PC) such as a desktop or notebook computer. In other embodiments, the client 110 is a mobile telephone, personal digital assistant, or other electronic device.

In one embodiment, the client 110 includes a browser module 112, a cookie cache 114 and a security module 300. The browser module 112 allows a user to view web pages of a website and/or other entities on the network 120. In one embodiment, the browser module 112 is a conventional web browser, such as MICROSOFT INTERNET EXPLORER or MOZILLA FIREFOX. The cookie cache 114 stores cookies associated with websites viewed by a user of the client 110 or otherwise provided to the client. The browser module 112 communicates with the cookie cache 114 for cookie data related to a website viewed by the client 110. The browser module 112 provides the cookies to associated websites when requesting pages from the websites, and stores cookies received from the websites in the cache 114.

Although FIG. 1 illustrates only a single cookie cache 114, there can in fact be multiple locations storing cookies at the client 110. For example, the browser module 112 can store cookies in a cache designated by the browser. In addition, browser add-ons (such as plug-ins and browser helper objects (BHOs)) can have their own cookie caches. One popular add-on, for example, is ADOBE FLASH®. This product has its own cache that stores specialized data files called local shared objects (LSOs), also called "Flash cookies." For purposes of clarity, this description refers to a single cookie cache 114 storing "cookies." However, it will be understood that the description is referring to cookie-like objects of any type in any storage location, including LSOs stored by ADOBE FLASH®.

The client 110 executes a security module 300. As a user interacts with the web server 130 via the web browser module 112, the security module 300 monitors network communications between the client 110 and the web server. Upon detecting presence of a cookie associated with a website in a response from the web server 130, the security module 300 communicates with the reputation server 140 and determines the reputation of the website associated with the cookie. The security module 300 processes the cookie based on the determined reputation of the website. For example, the security module 300 can block or pass the cookie.

The reputation server 140 receives requests for reputations of websites from the security modules 300 of clients 110, and returns reputation scores of the websites to the security modules 300. The reputation score represents an assessment of whether the associated website is trustworthy. "Trustworthy" in this sense can mean, for example, whether the website is known to use cookies to build profiles describing web browsing habits of users. A website that does develop such profiles is considered untrustworthy.

The reputation server 140 can determine the reputation score of a website based on a variety of criteria. In one embodiment, the reputation score of a website is based on whether the website is known to use cookies to build profiles to describe web browsing habits of users. Such scores can be manually provided by an administrator of the reputation server 140. In some embodiments, the reputation server 140 determines the reputation scores through automated techniques. For example, the reputation server 140 can generate the reputation score of a website based at least in part on the hygiene of users that are known to frequently visit the website (i.e., the users' propensities to be infected with malware) and/or whether the website is known to distribute malware. Generally, a large, well known website is assigned a reputation score indicating a good reputation. Conversely, a small, unknown website may be assigned a reputation score indicating a bad reputation. The reputation score can be numeric value normalized between a specified range, such as between and including zero and one, where a score of zero indicates extreme untrustworthiness while a score of one indicates extreme trustworthiness.

The network 120 enables communications among the client 110, the web server 130 and the reputation server 140 and can comprise the Internet. In one embodiment, the network 120 uses standard communications technologies and/or protocols. Thus, the network 120 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
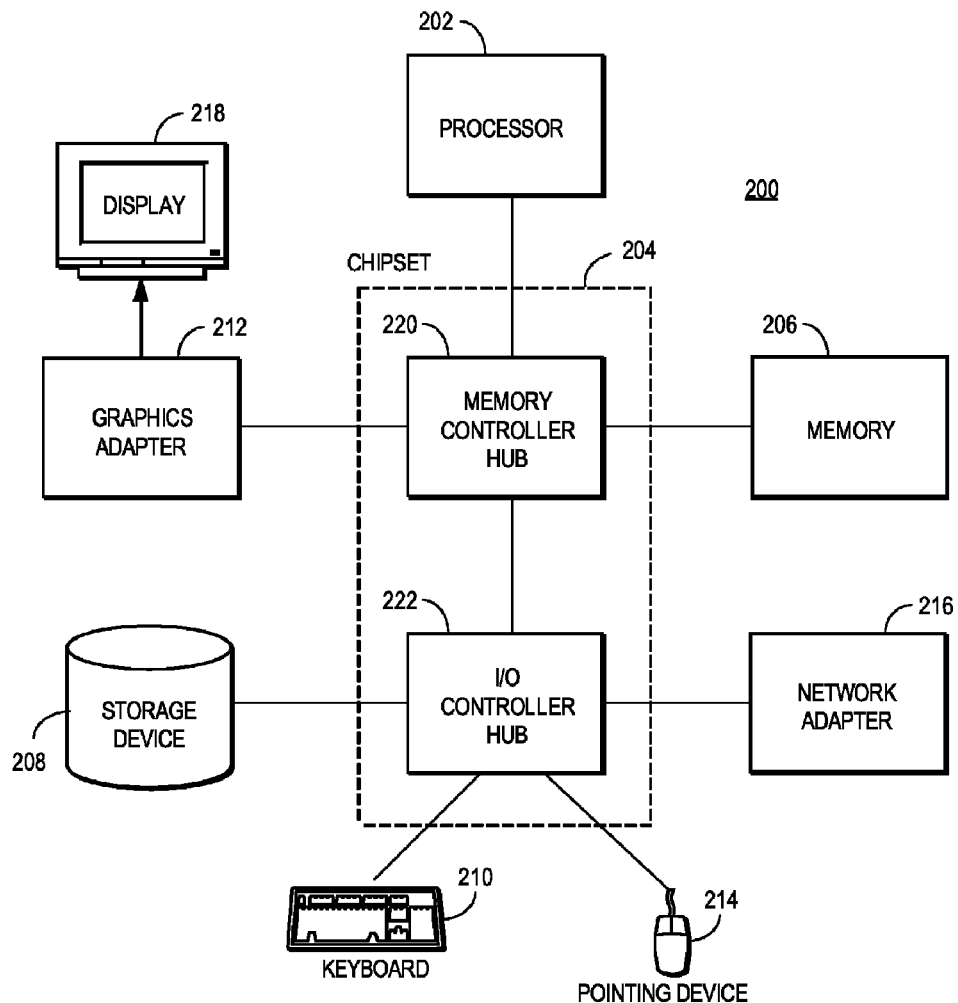
FIG. 2 is a high-level block diagram of a computer for acting as a client, a web server, or a reputation server according to one embodiment.

FIG. 2 is a high-level block diagram of a computer 200 for acting as a client 110, a web server 130 or a reputation server 140 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. In one embodiment, a computer 200 acting as a reputation server 140 can lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
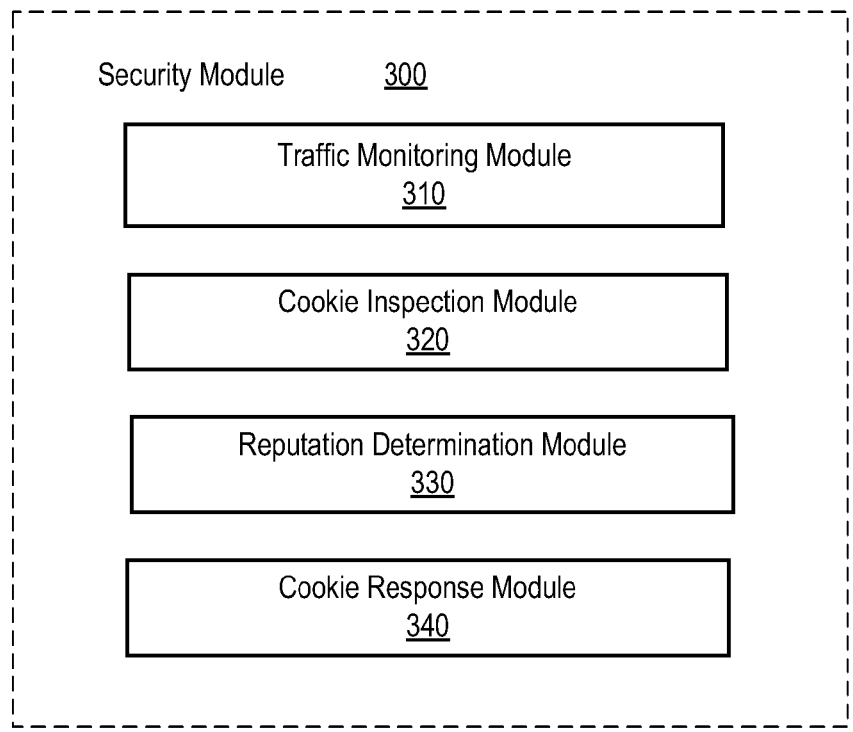
FIG. 3 is a high-level block diagram illustrating modules within the security module of a client according to one embodiment.

FIG. 3 is a high-level block diagram illustrating modules within the security module 300 of a client 110 according to one embodiment. The security module 300 includes a traffic monitoring module 310, a cookie inspection module 320, a reputation determination module 330 and a cookie response module 340. In general, the security module 300 monitors communications between the client 110 and a website provided by the web server 130, detects the presence of cookies in the communications, determines the reputation of the website responsible for the detected cookies, and processes the detected cookies based on the determined reputation of the website.

A traffic monitoring module 310 monitors communications between the client 110 and the web server 130. In one embodiment, the communications form a network traffic stream comprising one or more network data packets, such as standard HTTP requests and responses formed of TCP/IP packets. For example, when a user of the client 110 requests a web page of a website, the browser module 112 sends the user request in the form of a HTTP request to the web server 130. The web server 130 replies by sending the requested page as a HTTP response to the browser module 112. The traffic monitoring module 310 monitors the HTTP requests and responses between the client 110 and the web server 130. In one embodiment, the traffic monitoring module 310 monitors traffic at a point between the browser module 112 and the web server 130. For example, the traffic monitoring module 310 can intercept network traffic entering the client 110 before it reaches the browser module 112.

The cookie inspection module 320 analyzes the monitored communications to detect presence of cookies in the network traffic stream. In one embodiment, the cookie inspection module 320 implements a deep packet inspection (DPI) engine to filter the network traffic stream. The DPI engine examines the data parts (and possibly also the headers) of network packets that pass through the traffic monitoring module 310, searching for data indicating that a cookie is being transmitted. If a cookie is detected in the network traffic stream, the cookie inspection module 320 analyzes the cookie to identify its source. The identified source can be, for example, the website that provided the cookie, the web server 130 that provided the cookie, the domain of the server that created the cookie, etc.

The reputation determination module 330 receives information regarding the identified source of the detected cookie and determines the reputation of the source. Typically, the source is identified as a website, and the reputation determine module 330 determines the reputation of the website. In one embodiment, the reputation determination module 330 sends a request for the reputation of the website to the reputation server 140. The reputation server 140 determines a reputation score for the identified website and returns the score to the reputation determination module 330. Depending upon the embodiment, the reputation determination module 330 can cache the reputation scores to avoid needing to query the reputation server 140 each time a cookie associated with the website is detected.

The reputation determination module 330 evaluates the reputation score of the website to determine whether the reputation of the website is considered good or bad (i.e., is considered trustworthy or untrustworthy). In one embodiment, the reputation determination module 330 compares the score with a predetermined reputation threshold. If the reputation score of the website is less than the predetermined reputation threshold, the reputation determination module 330 determines that the website has a bad reputation. If the reputation score of the website is larger than the predetermined reputation threshold, the reputation determination module 330 determines that the website has a good reputation. The reputation determination module 330 sends a report to the cookie response module 340 describing the reputation of the website.

The cookie response module 340 processes a detected cookie upon receiving a report from the reputation determination module 330. In one embodiment, the cookie response module 340 processes the cookie by blocking the cookie from being stored by the browser module 112 in the cookie cache 114 if the reputation of the website is bad. This blocking can be performed by removing the detected cookie from the network stream so that the network traffic containing the cookie does not reach the browser module 112 (or add-in to which the cookie is directed). The cookie response module 340 can also pass the detected cookie to the browser module 112 if the reputation of the website is good.

Further, the cookie response module 340 can perform additional and/or different actions, such as reporting the reputation of the website to the user of the client 110, reporting the cookie blocking to the user, providing the user with a dialog box allowing the user to selectively block the cookie, logging the blocking, and notifying the reputation server 140 that the cookie was blocked. Depending upon the embodiment and/or configuration settings, the reputation reporting can take a plurality of forms, such as color-coded icon corresponding to the reputation score of the website displayed in a toolbar associated with the web browser 112.

The cookie response module 340 can also configure the browser module 112 based on the reputation of a website. For example, in response to detecting a large number of cookies from a website that has a bad reputation, the cookie response module 340 can instruct the browser module 112 to update the browser's privacy settings to block the storing of any cookies from the website in the cookie cache 114.

Figure 4:
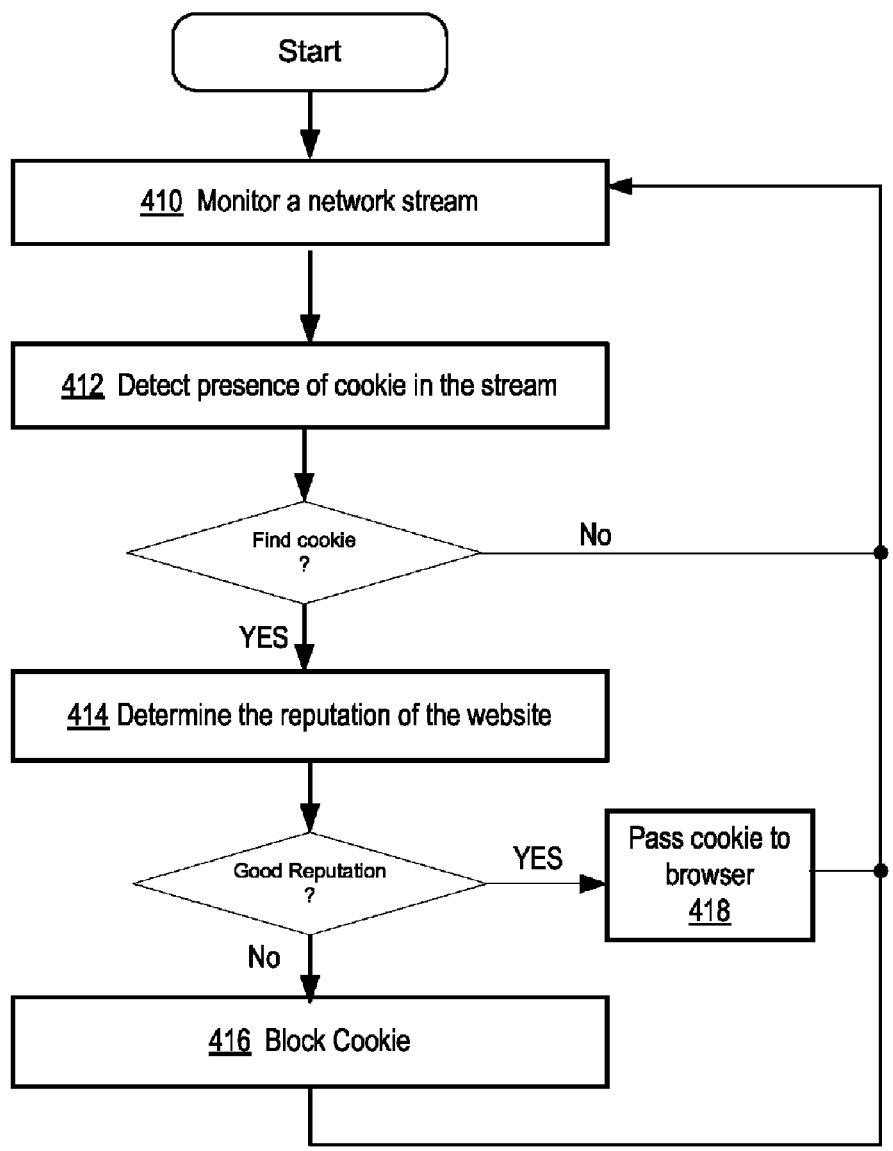
FIG. 4 is a flow chart illustrating steps performed by the security module selectively to block cookies based on the reputations of websites associated with the cookies according to one embodiment.

FIG. 4 is a flow chart illustrating steps performed by the security module 300 to selectively block cookies based on the reputations of websites associated with the cookies according to one embodiment. Other embodiments perform different and/or additional steps than the ones described here. Moreover, other embodiments perform the steps in different orders.

Initially, the security module 300 monitors 410 a network stream between the client 110 and the web server 130, and detects 412 the presence of cookies in the network stream. If no cookie is detected in the network stream, the security module 300 continues to monitor 410 the network stream. In response to detecting a cookie in the network stream, the security module 300 determines 414 the reputation of the website associated with the cookie. If the website associated with the cookie is determined to have a bad reputation by the security module 300, the security module 300 blocks 416 the cookie from being stored in the cookie cache 114 by removing the cookie from the network stream. If the website has a good reputation, the security module 300 passes 418 the cookie to the browser module 112 to be stored in the cookie cache 114, and the security module 300 continues to monitor 410 the incoming network stream.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of selectively blocking a cookie associated with a website, comprising:

using a computer to perform steps comprising:
monitoring a network traffic stream directed to a client from a website;
detecting presence of a cookie associated with the website in the network traffic stream;
determining a reputation of the website in response to detecting the cookie in the network traffic stream, wherein the reputation of the website is based at least in part on hygiene of a plurality of users that have visited the website, the hygiene representing propensities of the plurality of the users to be infected by malware;
comparing the reputation of the website with a predetermined reputation threshold;
blocking the cookie responsive to the comparison with the threshold indicating that the website has a poor reputation; and
passing the cookie responsive to the comparison with the threshold indicating that the website has a good reputation.

2. The method of claim 1, wherein the network traffic stream comprises a plurality of network data packets transmitted to the client from a web server providing the website.

3. The method of claim 1, wherein detecting presence of a cookie in the network traffic stream comprising analyzing the network stream using a deep packet inspection filtering.

4. The method of claim 1, wherein determining the reputation of the website comprises:
sending a request for the reputation of the website to an entity via a network; and
receiving a reputation score of the website from the entity.

5. The method of claim 1, wherein the reputation of the website represents an assessment of whether the website is trustworthy.

6. The method of claim 1, wherein blocking the cookie comprises removing the cookie from the network stream.

7. The method of claim 1, wherein the reputation of the website is based at least in part on whether the website is known to distribute malware.

8. A system for selectively blocking a cookie associated with a website, comprising:
a computer processor for executing computer program modules; and
a non-transitory computer-readable storage medium storing executable computer program modules comprising:
a traffic monitoring module configured to monitor a network traffic stream directed to a client from a website;
a cookie inspection module configured to detect presence of a cookie associated with the website in the network traffic stream;
a reputation determination module configured to determine a reputation of the website in response to detecting the cookie in the network traffic stream, wherein the reputation of the website is based at least in part on hygiene of a plurality of users that have visited the website, the hygiene representing propensities of the plurality of the users to be infected by malware; and
a cookie response module configured to:
compare the reputation of the website with a predetermined reputation threshold;
block the cookie responsive to the comparison with the threshold indicating that the website has a poor reputation; and
pass the cookie responsive to the comparison with the threshold indicating that the website has a good reputation.

9. The system of claim 8, wherein the network traffic stream comprises a plurality of network data packets transmitted to the client from a web server providing the website.

10. The system of claim 8, wherein the cookie inspection module is further configured to analyze the network stream using a deep packet inspection filtering.

11. The system of claim 8, wherein the reputation determination module is further configured to:
send a request for the reputation of the website to an entity via a network; and
receive a reputation score of the website from the entity.

12. The system of claim 8, wherein the reputation of the website represents an assessment of whether the website is trustworthy.

13. The system of claim 8, wherein the cookie response module is further configured to remove the cookie from the network stream.

14. A non-transitory computer-readable storage medium storing executable program modules for selectively blocking a cookie associated with a website, the modules comprising:
a traffic monitoring module configured to monitor a network traffic stream directed to a client from a website;
a cookie inspection module configured to detect presence of a cookie in the network traffic stream;
a reputation determination module configured to determine a reputation of the website in response to detecting the cookie in the network traffic stream, wherein the reputation of the website is based at least in part on hygiene of a plurality of users that have visited the website, the hygiene representing propensities of the plurality of the users to be infected by malware; and
a cookie response module configured to:
compare the reputation of the website with a predetermined reputation threshold;
block the cookie responsive to the comparison with the threshold indicating that the website has a poor reputation; and
pass the cookie responsive to the comparison with the threshold indicating that the website has a good reputation.

15. The computer program product of claim 14, wherein the network traffic stream comprises a plurality of network data packets transmitted to the client from a web server providing the website.

16. The computer-readable storage medium of claim 14, wherein the cookie inspection module is further configured to analyze the network stream using a deep packet inspection filtering.

17. The computer-readable storage medium of claim 14, wherein the reputation determination module is further configured to:
send a request for the reputation of the website to an entity via a network; and
receive a reputation score of the website from the entity.

18. The computer-readable storage medium of claim 14, wherein the reputation of the website represents an assessment of whether the website is trustworthy.

19. The computer-readable storage medium of claim 14, wherein the cookie response module is further configured to remove the cookie from the network stream.

* * * * *